(12) United States Patent
Elkasabi et al.

(10) Patent No.: US 11,708,540 B2
(45) Date of Patent: *Jul. 25, 2023

(54) METHODS OF PRODUCING CALCINED COKE FROM BIO-OIL AND CALCINED COKE PRODUCED THEREBY

(71) Applicant: The United States of America, as Represented by the Secretary of Agriculture, Washington, DC (US)

(72) Inventors: Yaseen M. Elkasabi, Wyncote, PA (US); Akwasi A. Boateng, Royersford, PA (US); Charles A. Mullen, Lansdale, PA (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/227,276

(22) Filed: Dec. 20, 2018

(65) Prior Publication Data

US 2019/0127652 A1    May 2, 2019

Related U.S. Application Data

(63) Continuation of application No. 14/972,881, filed on Dec. 17, 2015, now Pat. No. 10,202,557.
(Continued)

(51) Int. Cl.
*C10L 9/08* (2006.01)
*C10L 5/44* (2006.01)
(Continued)

(52) U.S. Cl.
CPC ............ *C10L 9/08* (2013.01); *C10L 5/447* (2013.01); *C10L 5/02* (2013.01); *C10L 5/361* (2013.01);
(Continued)

(58) Field of Classification Search
CPC . C10L 9/08; C08J 11/12; C10B 57/005; C10J 2300/0943
See application file for complete search history.

(56) References Cited

U.S. PATENT DOCUMENTS 5,158,668 A * 10/1992 Chahar ............... C10B 55/00
  208/131
9,434,885 B2 * 9/2016 Mullen ............... C10B 53/02
(Continued)

FOREIGN PATENT DOCUMENTS

EP    0159903 A2 * 10/1985 ............... C10L 9/08
EP    2199365 A1 *  6/2010 ............. C10B 53/02
JP    2005272569 A  * 10/2005

OTHER PUBLICATIONS

Derwent Translation of abstract of CN 105176564 (Year: 2015).*
(Continued)

*Primary Examiner* — Ellen M McAvoy
*Assistant Examiner* — Ming Cheung Po
(74) *Attorney, Agent, or Firm* — John Fado; Matthew Bussan

(57) ABSTRACT

Disclosed are methods of producing calcined coke from bio-oil from a biomass feedstock. Also disclosed are calcined cokes produced by such methods.

42 Claims, 8 Drawing Sheets
(6 of 8 Drawing Sheet(s) Filed in Color)

Related U.S. Application Data

(60) Provisional application No. 62/094,618, filed on Dec. 19, 2014.

(51) Int. Cl.
  *C10B 57/00* (2006.01)
  *C10L 5/36* (2006.01)
  *C10L 5/02* (2006.01)

(52) U.S. Cl.
  CPC ... *C10L 2200/0469* (2013.01); *C10L 2250/06* (2013.01); *C10L 2290/02* (2013.01); *C10L 2290/06* (2013.01); *C10L 2290/10* (2013.01); *C10L 2290/28* (2013.01); *C10L 2290/543* (2013.01); *Y02E 50/10* (2013.01); *Y02E 50/30* (2013.01)

(56) References Cited

U.S. PATENT DOCUMENTS

| | | | | |
|---|---|---|---|---|
| 10,202,557 | B2* | 2/2019 | Elkasabi | C10L 9/08 |
| 2010/0024283 | A1* | 2/2010 | Portilho | C10G 51/023 |
| | | | | 44/307 |
| 2015/0005547 | A1* | 1/2015 | Freel | C10G 3/42 |
| | | | | 585/14 |

OTHER PUBLICATIONS

Machine Translation of Kato (JP2005272569A) (Year: 2010).*
Derwent Translation of Xiong (CN 105176564) (Year: 2015).*
Derwent Translation of CN105176564 (Year: 2015).*
Machine Translation of JP2005272569A (Year: 2005).*

* cited by examiner

Fig. 7A
Fig. 7B
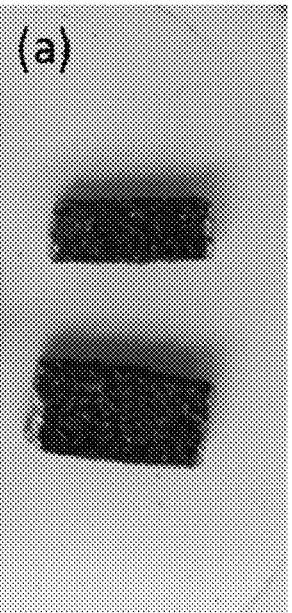
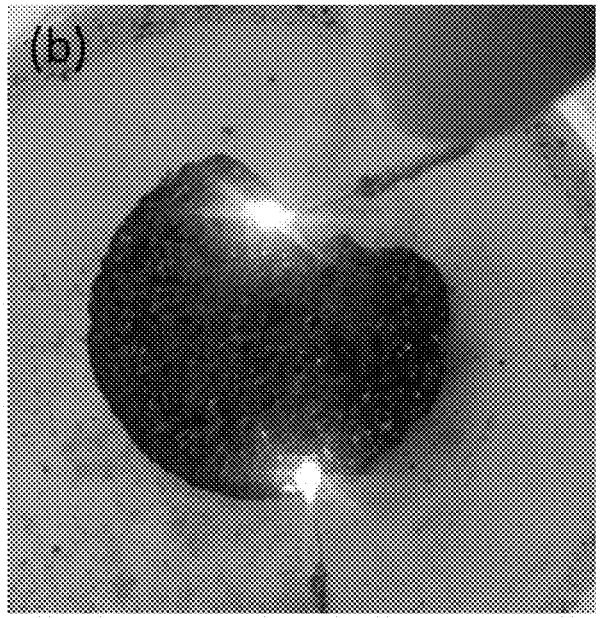

METHODS OF PRODUCING CALCINED COKE FROM BIO-OIL AND CALCINED COKE PRODUCED THEREBY

This is a continuation of application Ser. No. 14/972,881 filed 17 Dec. 2015, and U.S. Provisional Application No. 62/094,618 filed 19 Dec. 2014, which are herein incorporated by reference in their entirety.

REFERENCE TO RELATED APPLICATION

This application claims the benefit of U.S. Provisional Application No. 62/094,618, filed 19 Dec. 2014, which is incorporated herein by reference in its entirety.

BACKGROUND OF THE INVENTION

Disclosed are methods of producing calcined coke from bio-oil from a biomass feedstock, involving (1) subjecting the bio-oil to atmospheric distillation in a batch or continuous distillation unit and/or subsequently to vacuum distillation in a batch or continuous vacuum distillation unit to produce coke (i.e. distillation bottoms), (2) subjecting the coke bottoms to (a) stepwise calcination at about 400° to about 1000° C. for about 1 to about 30 minutes in an inert gas atmosphere in a reactor to produce devolatilized coke, optionally cooling the devolatlized coke, removing the devolatilized coke from the reactor and optionally crushing the devolatilized coke, and stepwise calcining the devolatilized coke at about 1200° C. to about 1400° C. for up to about 2 hours in an inert gas atmosphere in a reactor to produce calcined coke; or (b) devolatilization at about 400° to about 1000° C. for about 1 to about 30 minutes in an inert gas atmosphere in a reactor to produce devolatilized coke and stepwise calcining the devolatilized coke at about 1200° C. to about 1400° C. for up to about 2 hours in an inert gas atmosphere in the same reactor to produce calcined coke; or (c) stepwise heating at about 250° to about 400° C. for about 2 to about 10 hours, then subsequent stepwise calcination at about 400° to about 1000° C. for about 0.5 to about 5 hr to produce devolatilized coke, then calcining said devolatilized coke at about 1200° C. to about 1400° C. for about 1 to about 4 hours in an inert gas atmosphere in a batch or continuous reactor to produce calcined coke; or (d) stepwise calcination in a continuous calcining reactor between about 200° to about 1400° C. with up to about 1 hr residence time. Also disclosed are calcined cokes produced by such methods.

Since the worldwide consumption of liquid transportation fuels is outpacing the finite supply of fossil fuels, research for petroleum replacements have focused squarely on fuels (Mangla, V. et al., Curr. Chem. Biol., 7: 96-103 (2013); Sorrell, S., et al., Energy Policy, 38: 5290-5295 (2010)). Although finished motor fuels comprise the bulk of petrochemical refinery outputs, the world economy relies heavily on many everyday products that emanate from petroleum (U.S. Environmental Protection Agency, http://www.eia.gov/dnav/pet/pet_cons_psup_dc_nus_mbbl_a.htm). Some basic examples include commodity chemicals like BTEX petrochemical feedstock (benzene-toluene-ethylbenzene-xylenes), phenolic resins for plastics, waxes and lubricants, and asphalt for roofing and road pavement. Altogether, non-fuels co-products comprise 15-20% of all petroleum products (U.S. Environmental Protection Agency, http://www.eia.gov/dnav/pet/pet_cons_psup_dc_nus_mbbl_a.htm). Furthermore, many petrochemical refineries rely on non-fuels applications for the large majority of their product sales. Therefore, a strategy for renewable fuels must be coupled with a strategy to bring economic value via petrochemical co-product replacements. As an example, production of biodiesel was found to be economically viable due to the feasibility of producing glycerol in parallel (Haas, M. J., et al., Bioresource Technol., 97: 671-678 (2006); Lopes, D. C., et al., Energ. Econ., 40: 819-824 (2013)).

One of the most crucial yet least discussed co-products of value is petroleum coke (termed "petcoke"). Typically, the residuals remaining after vacuum distillation of crude oil (>600° C.) enter a delayed coker unit which thermally cracks the residual into petcoke and lighter fuel components (Olsen, T., "Chemical and Engineering Practice," An Oil Refinery Walk-Through, pp. 34-40, May 2014). Petcoke can be used as-is to substitute for coal in fuel applications or, if the metals and sulfur contents are low enough, can be calcined into coke products suitable for use in aluminum smelting anodes. The latter application alone can absorb more than 70% of the petcoke market (Zhang, Z., and T. Wang, J. Therm. Sci. Eng. App., 2: 021006-1-021006-8 (2010); Ellis, P. J., and C. A. Paul, "Tutorial: Petroleum Coke Calcining and Uses of Calcined Petroleum Coke," IN AIChE 2000 Spring National Meeting, Third International Conference on Refining Processes, Session T9005, Atlanta, Ga., 2000). Other high-volume markets for calcined coke utilize the remaining 30% for production of graphite, steel, and titanium dioxide (Ellis and Paul 2000; Paul, C. A., and L. E. Herrington, "Desulfurization of petroleum coke beyond 1600° C.," IN Light Metals: Proceedings of Sessions, TMS Annual Meeting, Warrendale, Pa., 597-601, 2001). Globally, 50M metric tons/year of aluminum are produced from approximately 25M metric tons of carbon per year, and low-quality coke can cost smelters more than $100/metric ton of product in consumption costs ("The carbon anode market—a global viewpoint (Interview with Michael Wrotniak, CEO of Aminco Resources)," Aluminum, June 2014; Alcoa Inc., "Aluminum smelting technical article," http://www.alcoa.com/global/en/about_alcoa/pdf/Smeltingpaper.pdf). Petcoke demand continues to rise annually, for which the U.S. provides more than half the global supply, and the market has gone wanting for sources that are renewable due to several sustainability factors ("Asian demand spurs U.S. net exports of petroleum coke to higher levels in early 2012," Petroleum Supply Monthly, U.S. Energy Information Administration, 25 May 2012, http://www.eia.gov/todayinenergy/detail.cfm?id=6430#; Chmelar, J., Size reduction and specification of granular petrol coke with respect to chemical and physical properties, Doctoral thesis, Norwegian University of Science and Technology, 2006). Although aluminum smelting can tolerate 2-3% sulfur, further reduction of sulfur is desired due to the corrosive nature of sulfur during the smelting process, which reduces anode lifetime (Edwards, L., "Impurity level distribution in gpc and cpc and impact on anode properties," IN Light Metals 2014: The Minerals, Metals, & Materials Society, Wiley, 2014, pp. 1093-1098). Even 1% sulfur ruins steel mechanical properties through brittleness. Demand for high-quality calcined coke is hampered by the continually declining quality of petcoke, via high sulfur and metals content (Ni, V)(Edwards, L. C., "Responding to Changes in Coke Quality," IN Proceedings of the 10th Australasian Smelting Technology Conference, Terrigal, N S W, 2007; Edwards, L. C., et al., "A review of coke and anode desulfurization," IN Light Metals, Wiley, 2007). Calciners currently must desulfurize coke to meet demand for both anodes and steel, which intensively increases processing costs.

Extremely high temperatures and/or pressures are required to initiate and propagate coke polymerization.

Hence, one cannot easily produce coke as a side product from enzymatic processes for cellulosic ethanol or lipid-based biodiesel processes since they operate under mild conditions (i.e., low temperature and pressure). While coke does come about as a side product in hydrodeoxygenation, coke deactivates catalysts and blocks catalyst pores, which makes coking an unwanted phenomenon in situ. Incidentally, thermochemical methods of biofuels production (e.g., gasification, pyrolysis) are well-suited for isolating biochar solid residue in parallel to the liquid crude oil that is produced ("bio-oil"). However, the high metals content of biochar renders it unsuitable for refined coke and much more amenable for soil remediation (Gurtler, J., et al., Foodborne Pathog. Disease, 11: 215-223 (2014)). When bio-oil is distilled, the solid residue that remains leftover could serve as a precursor for biorenewable calcined coke. Traditional bio-oil distillation had been largely ignored due to significant yield losses from thermal instabilities. Recently, we demonstrated the high-yield distillation of tail-gas reactive pyrolysis (TGRP) bio-oil under normal atmospheric distillation conditions (Elkasabi, Y., et al., ACS Sustainable Chem. Eng., p. 10.1021/sc5002879 (2014)). The TGRP process does not utilize any catalyst nor external hydrogen, yet surprisingly produces bio-oils with <10 wt % oxygen, comparable to catalytic fast pyrolysis bio-oil (vs. 34-40 wt % in traditional bio-oil produced by traditional fast pyrolysis), which gives rise to thermally stable bio-oils for distillation (Mullen, C. A., et al., Energy Fuels, 27: 387-3874 (2013)). Solid residues remaining post-distillation amount to >15% of the starting bio-oil, which amounts to a significant profit if it can be processed into suitable petroleum coke.

Herein we discuss bio-oil distillate bottoms as a source for renewable calcined coke in various applications.

SUMMARY OF THE INVENTION

Disclosed are methods of producing calcined coke from bio-oil from a biomass feedstock, involving (1) subjecting the bio-oil to atmospheric distillation in a batch or continuous distillation unit and/or subsequently to vacuum distillation in a batch or continuous vacuum distillation unit to produce coke (i.e. distillation bottoms), (2) subjecting the coke bottoms to (a) stepwise calcination at about 400° to about 1000° C. for about 1 to about 30 minutes in an inert gas atmosphere in a reactor to produce devolatilized coke, optionally cooling the devolatlized coke, removing the devolatilized coke from the reactor and optionally crushing the devolatilized coke, and stepwise calcining the devolatilized coke at about 1200° C. to about 1400° C. for up to about 2 hours in an inert gas atmosphere in a reactor to produce calcined coke; or (b) devolatilization at about 400° to about 1000° C. for about 1 to about 30 minutes in an inert gas atmosphere in a reactor to produce devolatilized coke and stepwise calcining the devolatilized coke at about 1200° C. to about 1400° C. for up to about 2 hours in an inert gas atmosphere in the same reactor to produce calcined coke; or (c) stepwise heating at about 250° to about 400° C. for about 2 to about 10 hours, then subsequent stepwise calcination at about 400 to about 1000° C. for about 0.5 to about 5 hr to produce devolatilized coke, then calcining said devolatilized coke at about 1200° C. to about 1400° C. for about 1 to about 4 hours in an inert gas atmosphere in a batch or continuous reactor to produce calcined coke; or (d) stepwise calcination in a continuous calcining reactor between about 200° to about 1400° C. with up to about 1 hr residence time. Also disclosed are calcined cokes produced by such methods.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7(a) shows examples of biorenewable calcined coke cut and sanded for multimeter measurements and FIG. 7(b) shows application of 6V potential across a piece of biorenewable calcined coke as described below.

DETAILED DESCRIPTION OF THE INVENTION

Figure 1:
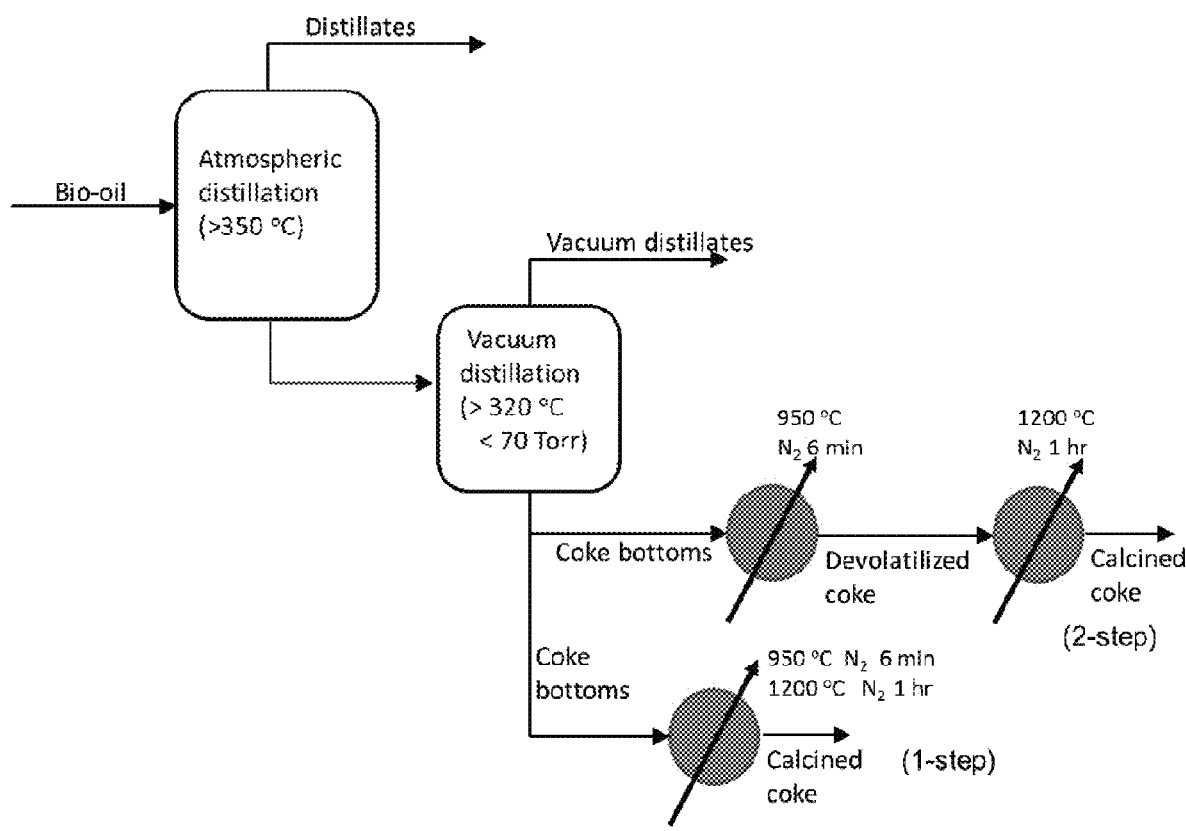
FIG. 1 shows process diagram for making calcined coke from fast pyrolysis bio-oil as described below.

Disclosed are methods of producing calcined coke from bio-oil from a biomass feedstock, involving (1) subjecting the bio-oil to atmospheric distillation (e.g., about 50° to about 400° C. (50° to 400° C.), about 700 to about 800 ton (700 to 800 ton), preferably about 760 ton (760 ton)) in a batch or continuous distillation unit (distillation apparatus) and/or subsequently to vacuum distillation (e.g., about 100° to about 400° C. (100° to 400° C.), about 20 to about 100 ton (20 to 100 ton)) in a batch or continuous vacuum distillation unit to produce coke bottoms (vacuum distillation first and atmospheric distillation second is not practical), (2) subjecting said coke (i.e. distillation bottoms) to (a) devolatilization at about 400° to about 1000° C. (e.g., 400° to 1000° C., preferably about 900° to about 975° C. (900° to 975° C.), more preferably about 950° C. (950° C.)) for about 1 to about 30 minutes (e.g., 1 to 30 minutes, preferably about 5 to about 15 minutes (5 to 15 minutes), more preferably about 6 minutes (6 minutes)) in an inert gas atmosphere (e.g., nitrogen, argon) in a reactor (e.g., furnace or kiln) to produce devolatilized coke, optionally cooling the devolatlized coke, removing the devolatilized coke from the reactor and optionally crushing the devolatilized coke, and calcining said devolatilized coke at about 1100° C. to about 1400° C. (e.g., 1100° C. to 1400° C., preferably about 1200° C. to about 1250° C. (1200° C. to 1250° C.), more preferably about 1200° C. (1200° C.)) for up to about 2 hours (e.g., up to 2 hours) in an inert gas atmosphere in a reactor to produce calcined coke; or (b) devolatilization at about 400° to about 1000° C. (e.g., 400° to 1000° C., preferably about 900° to about 1000° C. (900° to 1000° C.), more preferably about 950° C. (950° C.)) for about 1 to about 30 minutes (1 to 30 minutes, preferably about 5 to about 10 minutes (5 to 10 minutes), more preferably about 6 minutes (6 minutes)) in an inert gas atmosphere in a reactor to produce devolatilized coke and calcining the devolatilized coke at about 1100° C. to about 1400° C. (e.g., 1100° C. to 1400° C., preferably about 1200° C. to about 1250° C. (1200° C. to 1250° C.), more preferably about 1200° C. (1200° C.)) for up to about 2 hours (up to 2 hours) in an inert atmosphere in the same reactor to produce calcined coke; or (c) heating at about 250° to about 400° C. (e.g., 250° to 400° C., preferably about 300° C. (300° C.)) for about 2 to about 10 hours (2 to 10 hours, preferably about 3 hours (3 hours)), then subsequent devolatilization at about 400° to about 1000° C. (e.g., 400° to 1000° C., preferably at about 550° C. (550° C.)) for about 0.5 to about 5 hr (0.5 to 5 hours, preferably about 1 hr (1 hr)) to produce devolatilized coke, then calcining said devolatilized coke at about 1200° C. to about 1400° C. (e.g., 1200° C. to 1400° C., preferably at about 1200° C. (1200° C.)) for up to about 2 hours (e.g., up to 2 hours, preferably about 1 hr (1 hr)) in an inert gas atmosphere to produce calcined coke; or (d) calcination in a continuous calcining reactor between about 200° to about 1400° C. (e.g., 200° to 1400° C., preferably about 500° to about 1200° C. (500° to 1200° C.)) with up to about 1.5 hr (e.g., up to 1.5 hr) residence time, preferably about 500° C. (e.g., 500° C.) for about 30 minutes (e.g., 30 minutes), then about 800° C. (e.g., 800° C.) for about 40 minutes (e.g., 40 minutes), then about 1200° C. (e.g., 1200° C.) for about 20 minutes (e.g., 20 minutes). Also disclosed are calcined cokes produced by such methods.

A biomass feedstock is defined as any renewable, biological material that can be converted to another form of fuel or energy product. Biomass feedstocks are the animal, plant, and algal materials used to derive fuels. Biomass is defined as living or recently dead organisms and any byproducts of those organisms, plants, or animals. The term is generally understood to exclude coal, oil, and other fossilized remnants of organisms, as well as soils. In the context of biomass energy, the term generally refers to those crops, residues, and other biological materials (plant or animal) that can be used as a substitute for fossil fuels in the production of energy and other products. Biomass feedstocks include lignocellulosic materials and animal waste products or by-products. Biomass feedstocks include the plant and algal materials used to derive fuels like ethanol, butanol, biodiesel, and other hydrocarbon fuels. Examples of biomass feedstocks include corn starch, sugarcane juice, crop residues such as corn stover and sugarcane bagasse, purpose-grown grass crops, and woody plants. Lignocellulose refers to plant dry matter (biomass), so called lignocellulosic biomass. It is composed of carbohydrate polymers (cellulose, hemicellulose), and an aromatic polymer (lignin). These carbohydrate polymers contain different sugar monomers (six and five carbon sugars) and they are tightly bound to lignin. Lignocellulosic biomass can be broadly classified into virgin biomass, waste biomass, and energy crops. Virgin biomass includes all naturally occurring terrestrial plants such as trees, bushes and grass. Waste biomass is produced as a low value byproduct of various industrial sectors such as agricultural (e.g., corn stover, sugarcane bagasse, straw, etc.), forestry (e.g., saw mill and paper mill discards). Energy crops are crops with high yield of lignocellulosic biomass produced to serve as a raw material for production of second generation biofuel, examples include switch grass (*Panicum virgatum*) and Elephant grass. Animal by-products are agricultural by-products originating from livestock keeping. It includes among others solid excreta of animals. Animal waste products include animal manure, animal manure solids, poultry litter, etc. Animal manure refers to animal excrement (solid waste, dung) and urine, optionally with animal bedding, spilled food, spilled water, and/or feathers. This includes manure from, for example, chickens, turkeys, ducks, geese, swine, sheep, goats, cattle, dairy cows, horses, or rabbits. The animal manure may be solid or liquid or a slurry. Animal manure solids refer to manure solids that are present in a composition, such as poultry litter or an animal waste slurry, that contains manure. Solids content refers to the amount of solids present in a composition that remain after water from the liquid is evaporated. There are cases where animal manure solids exist that are not mixed with anything, such as in cattle feed lots. Poultry litter is a mixture of manure, bedding material (such as sawdust, wood shavings, straw, recycled paper, nut hulls, or rice hulls), spilled food and feathers. Poultry litter is the bed of material on which poultry, such as broiler chickens, are raised in commercial poultry rearing facilities. Because the same bed of litter is often used in successive growouts or flocks of poultry, the litter varies over time with the addition of manure to the litter, the addition of bedding or amendments between growouts, and efforts to clean or de-cake the litter between growouts. "De-caking" refers to the process whereby a mechanical device is used to sift the poultry litter between growouts to remove the larger particles, which typically have a higher moisture content than the rest of the litter.

Pyrolysis to obtain bio-oil can be performed on a bubbling fluidized bed pyrolysis system, for example see the one previously described by Boateng et al. (Boateng, A. A., et al., Ind. Eng. Chem. Res., 46: 1891-1897 (2007); Boateng, A. A., et al., Energy Fuels, 24: 6624-6632 (2010); U.S. patent application Ser. No. 13/777,020, filed 26 Feb. 2013; Mullen, C. A., et al., Energy and Fuels, 27: 3867-3874 (2013)). Pyrolysis can be conducted at a fluidized bed temperature of between about 450° and about 550° C. (e.g., 450° to 550° C.) and reaction/residence times from about 0.1 to about 5 seconds (e.g., 0.1 to 5 seconds; preferably about 0.1 to about 1 second (e.g., 0.1 to 1 second)). Control of the temperatures, and feed rate and data collection can be accomplished through use of standard control systems (e.g., Siemens PCS7 control system). The pyrolysis reactor described above can be modified for operation on recycled product gas by including a regenerative blower with an inlet port connected to the ESP outlet to return ESP tail gases to the fluidized bed plenum upon reheating through an electric heater. A remotely controlled gas outlet valve in the blower inlet line allows for the discharge of the preheated returned gases to maintain a constant system volume. A pressure transmitter in the blower inlet line can be integrated with the control system to modulate the gas outlet valve. The regenerative blower can be sized to provide sufficient flow and head to fluidize the sand bed. The system can be flushed with an inert atmosphere (e.g., nitrogen) during heating to remove system air. A small amount of nitrogen (<about 0.5 L/min) may be required to flow into the feed drop tube to maintain a positive pressure throughout the system as well as to aid feedstock flow. The amount of non-condensable gases recycled to the reactor may be about 10 to about 99% (e.g., 10 to 99%), preferably about 40 to about 90% (e.g., 40 to 90%), preferably about 60 to about 85% (e.g., 60 to 85%), preferably about 65 to about 80% (e.g., 65 to 80%), preferably about 70% (e.g., 70%) non-condensable gases to said reactor to produce deoxygenated bio-oil.

"Optional" or "optionally" means that the subsequently described event or circumstance may or may not occur, and that the description includes instances in which said event or circumstance occurs and instances where it does not. For example, the phrase "optionally comprising a defoaming agent" means that the composition may or may not contain a defoaming agent and that this description includes compositions that contain and do not contain a foaming agent.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

Unless defined otherwise, all technical and scientific terms used herein have the same meaning as commonly understood by one of ordinary skill in the art to which the invention belongs. As used herein, the term "about" refers to a quantity, level, value or amount that varies by as much as 30%, preferably by as much as 20%, and more preferably by as much as 10% to a reference quantity, level, value or amount. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Fast pyrolysis of biomass: Prior to fast-pyrolysis experiments, all feedstocks were ground and dried. Switchgrass (SwG) feedstock was provided by the McDonnell Farm (East Greenville, Pa.), *Eucalyptus benthamii* (Eucal) by Embrapa Forestry (Candoi, Parana, Brazil), and guayule bagasse (Guay) by Yulex (Chandler, Ariz.). Fast-pyrolysis of feedstock was carried out in the USDA fluidized bed fast pyrolysis system, as described previously (Mullen, C. A., et al., Energy Fuels, 27: 387-3874 (2013); U.S. patent application Ser. No. 13/777,020 filed 26 Feb. 2013). Briefly, 2 kg/hr of feedstock is fed through a fluidized sand bed reactor under 500° C., $N_2$ (FIG. 1$a$). The resulting vapors then pass through a cyclone which separates out char particulates. Liquid phases are then condensed from the vapor by four condensers in series. Oil precipitates from the non-condensable gases (NCGs) by two electrostatic precipitators (ESPs) in series. All experiments used the oil obtained from the ESPs. For tail-gas recycle experiments, a fraction of the non-condensable gas stream was mixed with the $N_2$ stream and recycled into the fluidized bed, using a preheater and gas blower. The pyrolysis system recycled the tail gas generally in the range of about 50-70%. Unless specified otherwise, biomass samples underwent the TGRP process.

Bio-oil distillation: Bio-oil samples were distilled using either a fractionating column or a short-path distilling head (Elkasabi, Y., et al., ACS Sustainable Chem. Eng., p. 10.1021/sc5002879 (2014)). Briefly, 20, 50, or 100 g of bio-oil was heated in a round-bottom flask connected to a distillation apparatus. Vapors were condensed and collected until the bottoms temperature reached 350° C. Then vacuum was applied, and more vapors were condensed and collected. After removing the vacuum and turning off the heating mantle, the round-bottom flask was allowed to cool. The hard glassy bottoms residue was chipped, scraped, and collected from the flask and crushed into a granular powder with a mortar and pestle.

Devolatilization and calcination of distillate bottoms: For devolatilization, 1 to 5 g of each distillate bottoms sample was placed in a high-temperature crucible and then the crucible placed in a static muffle furnace. The oven with crucibles was purged of air with nitrogen before placing lids on crucibles. With continuous nitrogen flow, the oven temperature was gradually raised to 950° C. over a period of approximately 1 hr, then held at that temperature for 6 minutes before the crucibles were removed and cooled. Devolatilized products were crushed into a powder for further analysis. For calcination, the same procedure was followed for either devolatilized bottoms or distillate bottoms, except that the temperature was gradually raised to a temperature of 1200° C. over a period of 3 hr (see FIG. 1). The crucibles were then held at 1200° C. for 1 hr, then the temperature was very gradually lowered to 400° C. before removing the crucibles from the oven in order to prevent crucible fracture. For one-step calcination, distillate bottoms underwent devolatilization and calcination in series without any intermediate cooling step.

Characterization: Powder X-ray Diffraction (XRD) was performed on bottoms samples (as-is, devolatilized, calcined) using a Rigaku high sensitive D/teX Ultra with a scan rate of 6 degrees per minute. Elemental analysis (CHN) by combustion, as well as sulfur analysis by titration, was carried out by Robertson Microlit Laboratories (Ledgewood, N.J.). Oxygen content was determined by difference. FTIR spectra of solid samples were obtained using a Nicolet Nexus 670 FTIR spectrometer (Madison, Wis.) with a Smart Orbit diamond attenuated total reflection (ATR) accessory, DTGS KBr detector splitter, and KBr splitter. Scanning electron microscopy images were taken using a Quanta 200 FEG Environmental Scanning Electron Microscope. Higher heating values of combustion were determined for distillate bottoms samples using a Leco AC600 bomb calorimeter. Ash content was determined by heating the sample in a crucible to 750-850° C. (ambient air) overnight. The mass remaining in the crucible was weighed, and this weight was normalized by the starting mass to calculate the % ash. Electrical conductivity measurements were performed using a CE Compass 305D variable DC power supply and a Cen-Tech P37772 multimeter. Calcined samples were cut into rectangles from a solid sample, and a colloidal silver paint was applied to each end of the rectangular sample. Cut samples were measured for electrical resistance across the length of the sample using a multimeter. Resistivity values were calculated based upon measurements of fixed, longitudinally-shaped samples.

Surface area measurements and temperature programmed oxidations were performed on a Quantachrome ASiQ with an attached Pfeiffer Vacuum PrismaPlus mass spectrometer (Quantachrome Instruments, Boynton Beach, Fla.). Prior to surface area measurements, samples were outgassed for 12 h at 200° C. Surface areas were then determined using the BET method over the pressure range of $0.025<P/P_0<0.3$. In a typical TPO analysis, about 12 mg of sample were placed in a sample tube sandwiched between packings of quartz wool and dried and degassed at 120° C. under vacuum for 20 min. Gas flow was then started using a mixture of 5% $O_2$ in helium (ILMO gas, Jacksonville, Ill.) set at a flow rate of 40 ml/min and the cell purged for 20 min prior to the start of the measurement. Under this gas flow and at this starting temperature, the sample was heated at 10° C./min to 1050° C. The mass spectrometer outputs representing the following m/e were recorded: 18 ($H_2O$), 28 (CO), 32 ($O_2$), and 44 ($CO_2$). X-ray fluorescence (XRF) was performed within a focused ion beam SEM (FEI Strata DB235) using an integrated x-ray fluorescence analyzer with separate x-ray source for trace elemental analysis.

Results and Discussion. Coke Preparation Steps: Although all coke samples originated from bio-oils of varying feedstock origins, we aimed to design a process for upgrading distillate bottoms such that all products converge towards similar compositions regardless of feedstock origins. The main reason was to remove feedstock dependence from an eventual biorefinery, which would enhance technology transfer from location to location. Calcined coke consists of >96% graphitized carbon domains, so all calcined bottoms products should theoretically be identical. After performing atmospheric and vacuum distillations, a semi-liquid distillate with a jet black residue remained in the flask. Under vacuum, the residue resembled a molten viscous tar. When raised to atmospheric pressure and cooled quickly, the tar solidified into a glassy black solid. Chipping and grinding the solid was the only practical way of utilizing it for post-processing. For industrial purposes, a continuous distillation process would handle the vacuum distillate bottoms under raised temperature, in a manner very analogous to a traditional petroleum refinery.

Industrially, calcined coke is manufactured by feeding the coke emanating from the petroleum residue or delayed coker (termed "green coke") into a rotary kiln. The kiln gradually heats the green coke under inert atmosphere through multiple temperature zones, each of which serves a different purpose beginning from volatile evolution to structural adjustments through grain growth. For our laboratory batch experiments, we divided the heat treatment steps into multiple stages in order to segregate the phases of coke transformation. As seen in FIG. 1, the first step consisted of removing any volatiles, such that only fixed carbon remained behind. Since fixed carbon consists of very high molecular weight polyaromatic hydrocarbons (PAHs), the devolatilization step serves the dual purpose of increasing the carbon percentage as well as removal of volatile compounds from fixed carbon. A second step (calcination) was applied to the devolatilized bottoms, which served the purposes of (1) eliminating any heteroatoms, (2) rearranging free carbon chains into polyaromatic domains resembling graphite, and (3) increasing the size of the polyaromatic carbon domains. We also investigated a one-step calcination process, wherein the calcination occurs immediately after the devolatilization without removing the devolatilized sample from the furnace. The devolatilization expands the fixed carbon and stretches it out to thinner strands for calcination, so we anticipated that the one-step calcination will have a fundamentally different effect on the coke quality and/or structure. This one-step investigation was necessary since it mimics temperature grading through a rotary kiln.

Elemental Analysis: Table 1 presents the elemental and proximate analysis of the distillate bottoms at different processing stages. Comparisons can be made with typical values for petroleum coke (Table 2). Distillate bottoms exhibited evidence of feedstock effects since they contain remnants of biomacromolecules; for example, guayule contained higher concentrations of nitrogen. Overall, the bottoms products surprisingly exhibited properties which made them useful as-is. Via bomb calorimetry, the bottoms surprisingly possessed heating values between 32.6 and 36.4 MJ/kg, a significantly higher range than that of traditional petroleum coke or coal (29.8 and 25.2 MJ/kg, respectively) (Andrews. A., and R. K. Lattanzio, "Petroleum Coke: Industry and Environmental Issues," Congressional Research Service, 2013). Combined with the tail-gas from the TGRP process (HHV=12.4 MJ/kg) (Mullen, C. A., et al., Energy Fuels, 27: 387-3874 (2013)), distillate bottoms can still serve as fuel for the endothermic pyrolysis reaction to reduce heat demand for a pyrolysis biorefinery.

The surprisingly low ash content and absence of sulfur enable distillate bottoms to be used for both fuel and higher quality cokes if the bottoms calcination step is optimized with respect to material properties. Devolatilization of the distillate bottoms produced a lustrous black solid which is usually indicative of greater structural order. Losses due to volatiles comprised at least 38% to upwards of 60% of the distillate bottoms. While these percentages are considered relatively high for asphalting applications, a partial devolatilization step is conceivable, which would remove a portion of the volatiles without further heating. Devolatilization surprisingly removed nearly all of the residual hydrogen, oxygen was reduced to less than half the original content, and nitrogen remained unchanged. It was only during high-temperature calcination that the nitrogen content surprisingly fell significantly. Most importantly, the carbon percentages surprisingly increased for both devolatilization and calcination steps. The renewable calcined coke resulting from this process surprisingly had properties similar to calcined petroleum coke, but in addition had two properties which surprisingly render it superior. Sulfur was surprisingly present in only trace quantities (below 500 ppm), and for specific feedstocks the ash/metals content surprisingly amounted to less than 0.7%, with low concentrations of specifically problematic metals such as vanadium, nickel, sodium, potassium, and calcium. Very low sulfur levels strongly benefit aluminum smelting anodes, graphite, and steel metallurgy. In aluminum smelting, sulfur reduces the reactivity of carbon anodes and produces toxic $SO_2$ and COS gases. To make steel, coke used during the recarburizing step should be as low in sulfur as possible since its presence causes brittleness in the final product. For graphitization of calcined coke, both sulfur and nitrogen induce "puffing" which ruins the structural ordering (Ellis, P. J., and C. A. Paul, "Tutorial: Petroleum Coke Calcining and Uses of Calcined Petroleum Coke," IN AIChE 2000 Spring National Meeting, Third International Conference on Refining Processes, Session T9005, Atlanta, Ga., 2000). Although the nitrogen and oxygen levels could still be reduced further, these calcined bottoms products surprisingly resulted from only 1 hr of calcination at 1200° C., whereas smaller levels of heteroatoms (e.g., nitrogen, hydrogen, oxygen) can come about from higher temperatures and longer reaction times. Nevertheless, the results also surprisingly illustrated the greater efficiency in process time and temperature for calcining distillate bottoms as compared to petroleum coke. Elemental analysis (EA) results from the one-step procedure surprisingly produced similar results, with no indication of improved carbon percentages. Yields of devolatilized bottoms ranged from 50 to 65%, depending on the starting volatiles content. Calcination of devolatilized bottoms consistently resulted in an 85-87% yield across all bottoms samples, which surprisingly indicated the uniformity of the process into a defined product. Furthermore, HHV values for calcined products surprisingly all measured to be nearly identical values (around 33.3 MJ/kg) which, as noted above, was significantly higher range than that of coal. Since HHV is directly related to atomic composition, the identical HHV values surprisingly demonstrated the convergence of all bottoms samples towards a standardized end product (see also Table 8 below).

Metallic impurities can alter the application and/or final end-use properties for calcined coke. For aluminum smelting anodes, the electrolysis introduces the metal impurities into the aluminum product and affects the reduction efficiency (Hardin, E. E., and R. E. Gehlbach, "Calcined petroleum coke for the aluminum industry," Great Lakes Carbon Corporation—Information Booklet, 1992); therefore aluminum smelters require low ash and/or metals content. We employed x-ray fluorescence to elucidate the amount and types of metal impurities that make up the ash. Rather than directly scanning the coke samples, increased resolution and accuracy were obtained by scanning the ash and using the results to recalculate concentrations for the coke samples. Table 3 displays the XRF trace metal analysis for detected metals in comparison with general values for petroleum coke. In general, most metal concentrations surprisingly fell close to or within limits typically found for petroleum coke. Since steel is an alloy of iron, excess iron levels in calcined coke should only benefit the end composite. Greater incidences of problematic concentrations of metallic impurities became more frequent as the calcined ash content increased; specifically, calcined coke from pyrolysis liquids made from *Eucalyptus benthamii* contained relatively low concentrations of only a few metals, whereas calcined coke from guayule bagasse had high concentrations of Si, K, Fe, and Cu. Vanadium and nickel are two specific metals which are heavily undesired in the petrochemical and anode industries, due to catalyst poisoning and air reactivity, respectively (Mandal, P. C., et al., J. Japan Petrol. Inst., 1: 18-28 (2014)). Their levels in calcined bottoms surprisingly remained mostly absent or at very low concentrations.

Figure 2:
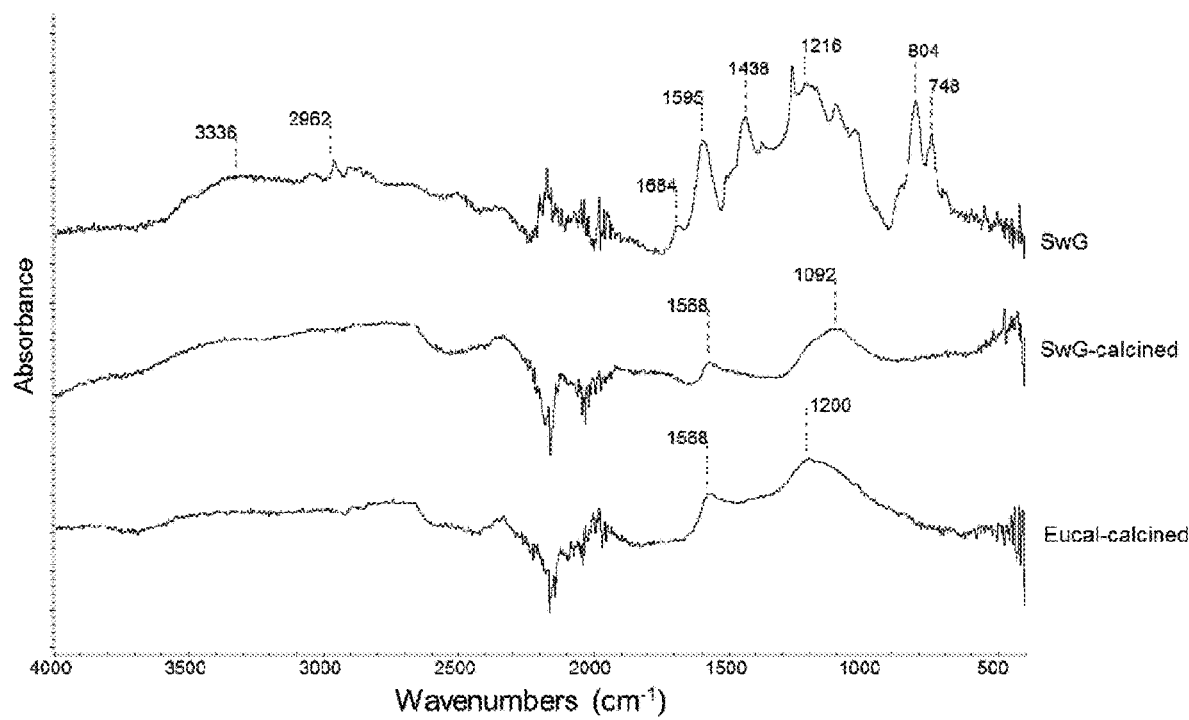
FIG. 2 shows FTIR spectra of distillate bottoms is, before and after calcination as described below.

FTIR Spectroscopy: Due to the very heavy and conductive nature of the calcined coke molecules, techniques for characterization were limited. Calcined coke (in general, and our product) is insoluble in every common solvent. We used FTIR to assess the presence of functional groups and chemical bonds in fresh distillate bottoms, as well as the predominant chemical bonds present in the structured calcined bottoms. While calcined and/or graphitized cokes have been characterized by the complementary Raman spectroscopy method, recent studies have revealed useful information with FTIR as well (Zhao, J., et al., Carbon, 47: 744-751 (2009); Garcia, A. B., et al., Carbon, 47: 2563-2570 (2009); Sarkar, A., et al., Fuel, 117: 598-607 (2014)). FIG. 2 shows FTIR spectra for switchgrass distillate bottoms (as-is, calcined) and *eucalyptus* distillate bottoms (calcined). From the switchgrass distillate bottoms spectrum, oxygenated species existed as alcohol groups (3336 cm$^{-1}$), carbonyls (1684 cm$^{-1}$), and C—O linkages (1300-1000 cm$^{-1}$); other functional groups included the C—H stretch (2962 cm$^{-1}$) and aromatic C—C(1595 and 1438 cm$^{-1}$). In contrast, the calcined samples studied always showed only two peaks: a singular aromatic C—C peak (1568 cm$^{-1}$) and a C—O stretch (1092-1200 cm$^{-1}$). Although all samples contained aromatic C—C bonds, the number of C—C peaks were surprisingly reduced to a single broad band in calcined samples, which reflected two phenomena: (1) homogenization of chemical composition and structure, and (2) increased restriction of bond vibrations due to structural order. While the oxygen content was relatively small in calcined samples, the C—O peak at 1092 and/or 1200 usually appeared with strong intensity, compared with peaks of other functional groups. Hence, the C—C and C—O peaks appeared to be of similar peak intensity. In addition, the two FTIR bands corresponded well with the Raman shift values reported in literature for calcined petroleum cokes (Zhao, J., et al., Carbon, 47: 744-751 (2009)).

Figure 3:
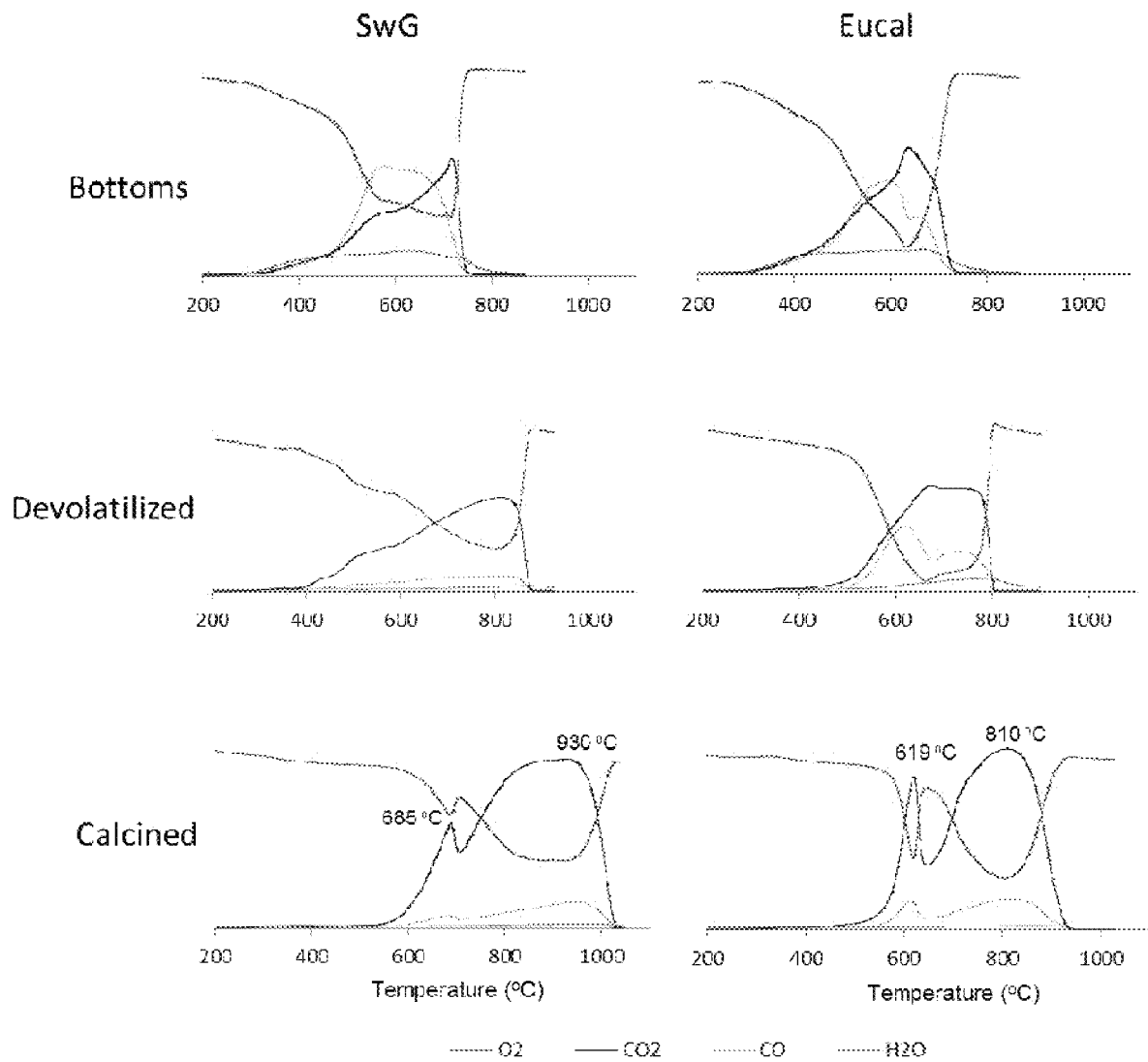
FIG. 3 shows TPO plots of distillate bottoms, taken at various stages of the calcination process as described below.

Temperature Programmed Oxidation (TPO): Temperature programmed oxidation is a method for observing oxidation trends and products as they relate to the structural and compositional properties. Oxidation temperatures of carbonaceous solids are directly proportional to their degree of structural order (Garcia, A. B., et al., Carbon, 47: 2563-2570 (2009); Oliveira, H. A., et al., J. Braz. Chem. Soc., 23: 868-879 (2012); Chen, K., et al., Fuel, 113: 274-279 (2013)). We used TPO to evaluate oxidation resistance of coke samples by observing the oxidation products produced. Each sample was reacted under 5% oxygen in helium in order to observe evolution of water and carbon oxides. FIG. 3 displays the TPO profiles for bottoms from two different bio-oils throughout the calcination process. For all bottoms samples, TPO profiles revealed a gradual reduction in the amount of water produced until the calcined samples surprisingly produced no water, indicative of the high purity of carbon in calcined coke. Temperatures for peak oxygen consumption and ignition temperature (i.e., onset of oxygen consumption) increased for both devolatilization and calcination steps, indicating the role each step contributed towards structural improvement of distillate bottoms. While peak temperatures may exhibit slight variations due to differences in sample size, the ignition temperature was not affected, and the ignition temperatures confirmed the trends found with the peak oxygen consumption temperatures.

Generally speaking, combustion of carbon into CO indicates a degree of resistance against the complete oxidation into $CO_2$ (and hence so does the $CO/CO_2$ ratio). As-is, the distillate bottoms surprisingly exhibited significantly greater levels of CO production relative to $CO_2$ as compared with typical fast-pyrolysis biochar (Jackson, M. A., et al., BioResources, 8: 5461-5474 (2013)). Since biochar (the side product from fast pyrolysis) is heavily loaded with metals compared with distillate bottoms, biochar carbon morphology is amorphous, as indicated by its low temperature of oxidation (Chen, K., et al., Fuel, 113: 274-279 (2013)). The volatiles content of distillate bottoms played a role in their higher heating values by facilitating the combustion of the higher molecular weight carbon. This was evidenced by the significant increase in TPO combustion temperature in going from "as-is" to devolatilized bottoms. Although the decrease in elemental oxygen content was much greater for the devolatilization step, the drop in $CO/CO_2$ ratio was much greater for the calcination step. This disparity indicated that the drop in $CO/CO_2$ ratio was likely due to the structural reordering rather than due to a loss in reactive oxygen. Another clear indication of the structural homogenization of calcined coke was the similarity of the CO and $CO_2$ curves. In the bottoms, the CO and $CO_2$ profiles appeared to evolve independently whereas the two gases evolved in parallel in the devolatilized and calcined samples.

Figure 4:
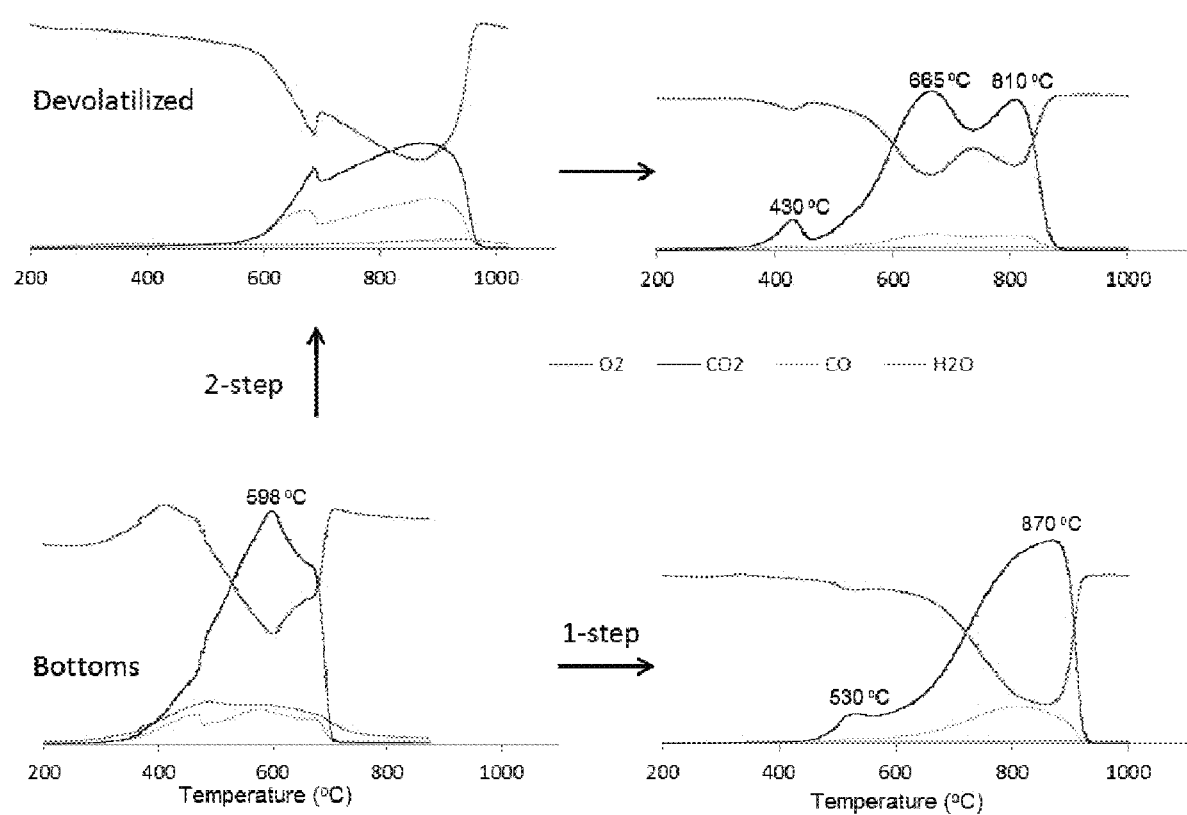
FIG. 4 shows TPO plots of guayule distillate bottoms, taken for both the two-step and one-step calcination processes as described below.

With regards to one-step calcination, FIG. 4 displays the TPO of guayule distillate bottoms through the calcination process in comparison with a two-step calcination. While it appeared that the devolatilization step significantly improved the structural ordering via the higher peak temperature, the subsequent calcination step reduced the peak combustion temperature to 810° C. while simultaneously segregating the coke into three specific domains. On the other hand, the one-step procedure surprisingly improved the morphological uniformity by increasing the peak temperature and reducing it to a single curve, with the exception of the small peak at 530° C.

Figure 5A:
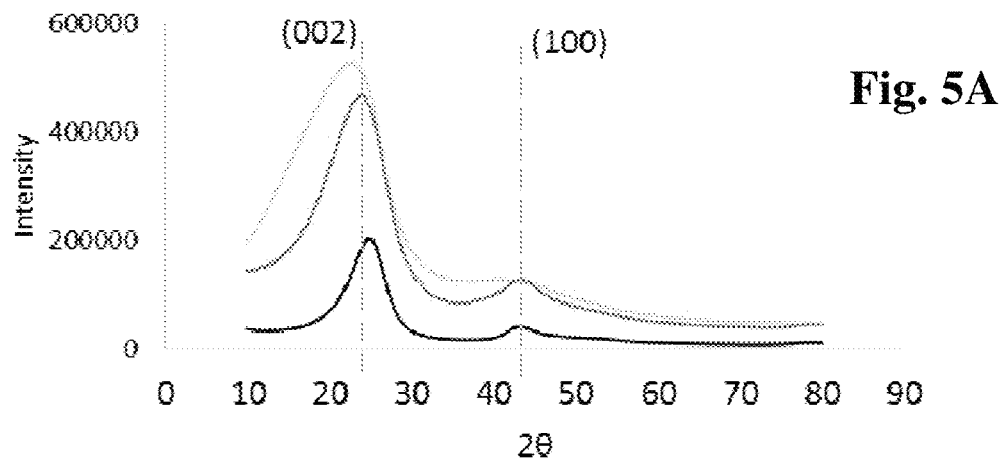
FIG. 5(a) XRD spectra of distillate bottoms products, taken at different stages of the calcination process, where
Figure 5B:
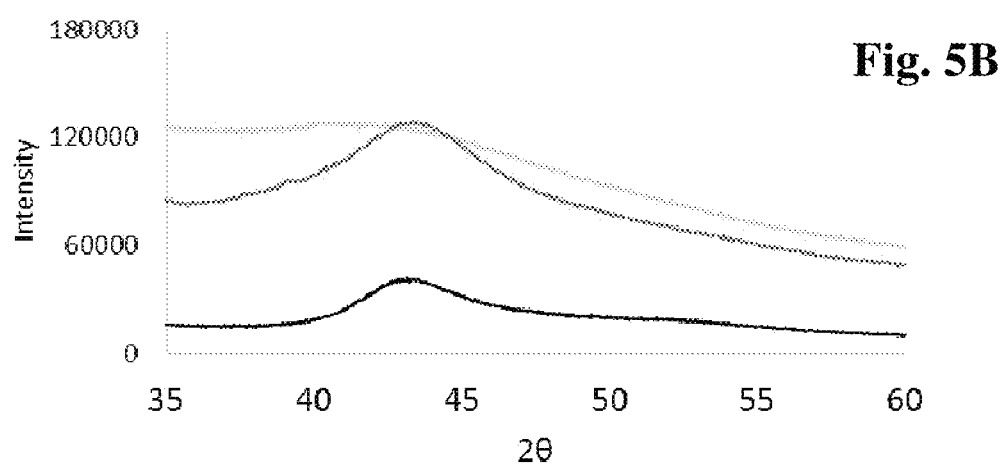
FIG. 5(b) and FIG. 5(c) are zoomed in at the 43° and 78°, respectively, as described below.
Figure 5C:
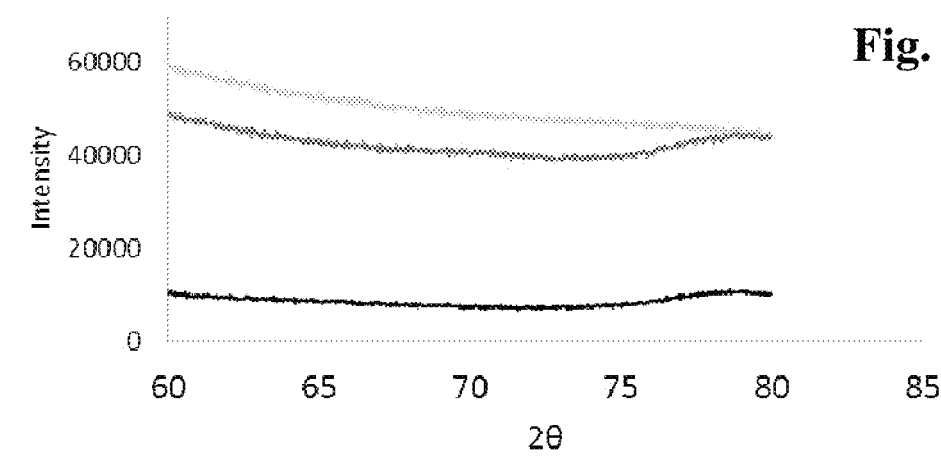
Figure 6A:
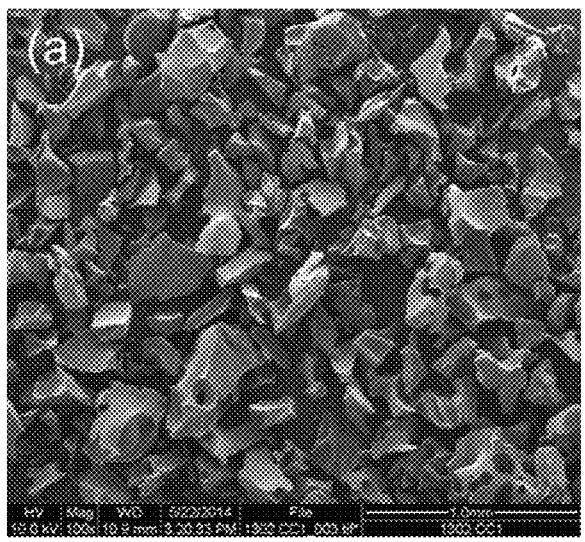
FIG. 6(a, b, c, d) shows SEM images of calcined switchgrass distillate bottoms at various magnifications, indicative of sponge coke morphology as described below, at 100× (FIG. 6a), 2500× (FIG. 6b), and 5000× (FIG. 6c and FIG. 6d), as described below.
Figure 6B:
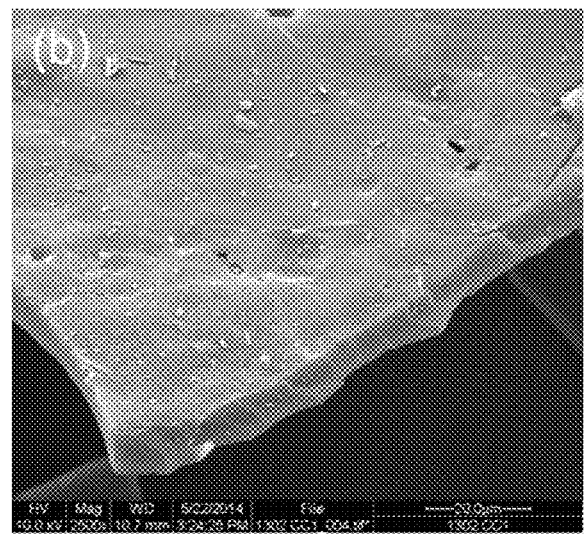
Figure 6C:
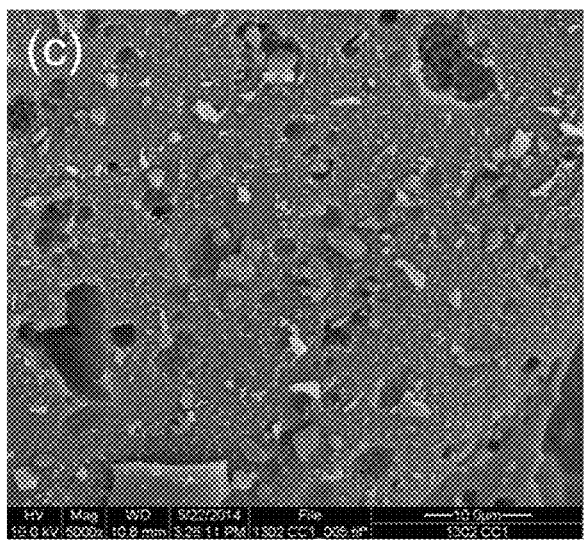
Figure 6D:
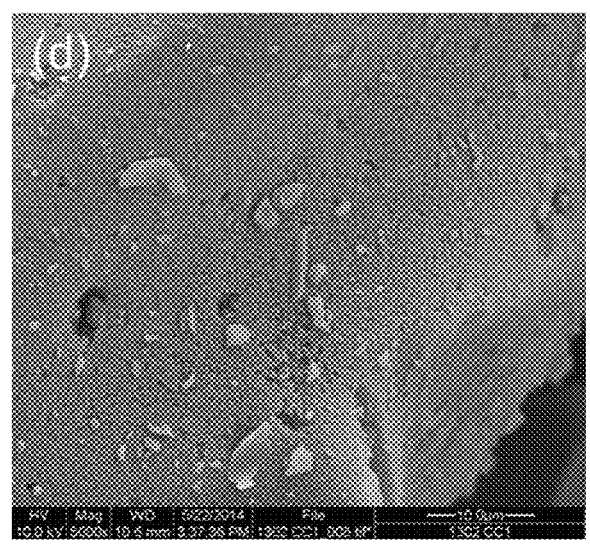
Figure 8:
FIG. 8 shows measurement of a current-voltage (I-V) curve for a piece of biorenewable calcined coke as described below; Disk dimensions: d=30.3 mm; t=4.3 mm.
Figure 8:
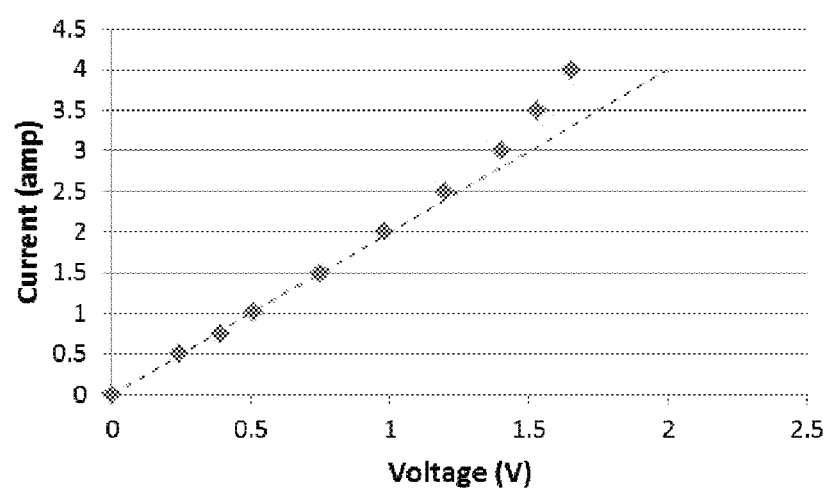

Crystallinity: Since calcination aims to improve the morphology of fixed carbon, it is expected that the calcination process would quantitatively improve the structural order. In this regard, XRD is another critical method for assessing any crystalline structures and/or hierarchical order. We used XRD to examine distillate bottoms at each stage of the calcination process. FIG. 5 displays XRD spectra from switchgrass-derived distillate bottoms taken at each step of the calcination process. Graphitic domains arrange according to a hexagonal structure, so this structure was taken as the basis for interpretation (Li, Z. Q., et al., Carbon, 45: 1686-1695 (2007)). The (002) peak at 2θ=22-26° indicated interlayer scattering across sheets within a graphite crystallite, whereas the (100) peak at 42-44° C. emanated from intralayer scattering across the sheet (Adelhelm, P., Sci. Technol. Adv. Mater., 13: 1-8 (2012)). As the heat treatment of bottoms progressed, the (002) peak gradually decreased in full width at half maximum (FWHM) (FIG. 5a), indicating a gradual increase in crystallite size. Similarly, the (100) peak appeared after devolatilization, then became more defined into two separate peaks upon calcination (43 and 52° FIG. 5b). A similar trend was seen for the peak at 78° (FIG. 5c). To calculate the crystallite grain sizes $L_c$ and $L_a$, we can use the equations (2) developed by Short and Warlker for turbostratic carbons, where 2θ at (002) and (100) are used for $L_c$ and $L_a$, respectively:

$$L_c = \frac{0.45\lambda}{\Delta \sin \theta_{(002)}}$$ (2)

$$L_a = \frac{0.92\lambda}{\Delta \sin \theta_{(100)}}$$

Table 4 shows the calculated values for all samples. The devolatilization step increased the crystallite size, which simply resulted from the absence of scattering from amorphous volatiles. However, more significant increases in crystallite size occurred for calcination of devolatilized samples, indicating that the calcination process effectively increased the structural order present within the sample. Most of the calcined samples approached >26 angstroms crystal grain size, which correlates with required anode specifications for calcined petroleum coke (Edwards, L., et al., "Evolution of anode grade coke quality," IN Light Metals 2012, Wiley, 2012, pp. 1207-1212). In particular, switchgrass-based samples showed the greatest increases of crystallite dimensions. One interesting correlation existed between the TPO and XRD results, in that an increase or decrease in the peak oxygen consumption temperature resulted in a similar change for crystallite sizes. For example, guayule bagasse distillate bottoms crystallites exhibited the greatest sizes when devolatilized, whereas the calcined version exhibited smaller sizes overall. Similarly, the TPO temperature of combustion for devolatilized guayule bottoms greatly increased to temperatures near 1000° C., whereas the two-step calcined version only reached 810-875° C. One-step calcination of guayule bottoms produced both a higher temperature stability and a larger crystallite size, thus falling in line with the aforementioned trend. It is crucial to note that the conditions used in these experiments (1200° C., 1 hr) represented relatively mild conditions for coke calcination, yet surprisingly produced properties comparable to or better than calcined petroleum coke. Even better crystallite properties are expected to arise from longer calcination times and/or greater temperatures (e.g., about 1200° to about 1400° C. (1200° to 1400° C.), about 1 to about 4 hr (1 to 4 hr)) because the crystallite dimensions each follow tightly linear trends with respect to processing temperature (Feret, F. R., Analyst, 123: 595-600 (1998); Ellis, P. J., and C. A. Paul, "Tutorial: Petroleum Coke Calcining and Uses of Calcined Petroleum Coke," IN AIChE 2000 Spring National Meeting, Third International Conference on Refining Processes, Session T9005, Atlanta, Ga., 2000). Another more accurate method for calculating the crystallite size is based on the methods used for calcined petroleum coke, rather than the method for nanostructured carbon as mentioned earlier. When employing equation (3) from the ASTM standard of calculating $L_c$, the crystallite $$L_c = \frac{0.89\lambda}{\Delta \cos \theta_{(002)}}$$ (3)

$$L_a = \frac{1.84\lambda}{\Delta \cos \theta_{(100)}}$$

dimensions are directly comparable to any analysis of industrial calcined coke. While the final crystallite sizes (Table 5) were slightly less than the target values of 24 A, the results illustrated the positive effect of calcination on crystalline structure, by way of the gradual increases in $L_c$.

Morphology by SEM: Variations in coke morphology play critical roles in their end-use properties. Sponge coke, a coke that is highly porous with a sponge-like appearance, is predominantly preferred in the petcoke industry. Aluminum smelting anodes rely on the sponge coke porosity for diffusion and adhesion of additives like pitch and binders into the coke before the anode is fully baked into a finished product (Ellis, P. J., and C. A. Paul, "Tutorial: Petroleum Coke Calcining and Uses of Calcined Petroleum Coke," IN AIChE 2000 Spring National Meeting, Third International Conference on Refining Processes, Session T9005, Atlanta, Ga., 2000). In contrast, shot coke consists of hard pellets (2-4 mm), which is undesired for many applications. We assessed the morphology of coke samples via images taken by SEM (FIG. 6). The largest magnification image showed that the fragments were irregularly shaped and sized to much less than the 1 mm scale bar, in contrast to the large pellets found in shot coke. Higher magnification images revealed predominant sections of coke with bubble-like appearances, in addition to a porous structure reflective of sponge coke morphologies. There was uniqueness in the SEM data since nearly all of the calcined coke was "sponge coke" morphology, and the prior art has all products being a mixture of sponge coke and shot coke morphologies. While BET surface area measured to be relatively low for devolatilized samples (10-20 m²/g), wider variations occurred for some calcined samples (150-300 m2/g). Low porosities are desired, so optimization of both the temperature heat-up rate and post-calcination grinding steps may be necessary (Ellis, P. J., and C. A. Paul, "Tutorial: Petroleum Coke Calcining and Uses of Calcined Petroleum Coke," IN AIChE 2000 Spring National Meeting, Third International Conference on Refining Processes, Session T9005, Atlanta, Ga., 2000); Cannova, F., et al., "Calcined coke particle size and crushing steps affect its vbd result," IN Light Metals 2011, Wiley, 2011, pp. 937-939).

Electrical conductivity: Ultimately, an assessment of end-use applications for calcined distillate bottoms requires measurement of end-use properties. To this end, electrical conductivity measurements were performed on switchgrass samples calcined in one-step. These samples effectively kept the calcined coke constricted to a solid porous phase that was amenable to cutting and shaping. Long rectangular samples were cut out in order to ensure accurate resistivity calculations, and a colloidal silver paint on opposing faces ensured even distribution of current flow across the sample width. When applied to samples of various dimensions and aspect ratios, an apparent resistivity value of 1.5 mΩ-m (+/−0.34) was obtained, which surprisingly meets the requirements for calcined coke properties. If we further consider that the calcined material comprises of a porous network with air (an insulator) filling the voids, the resistivity reduces even further, in proportion to the porosity.

FIG. 7(a) shows representative cut samples of biorenewable calcined coke used for resistivity measurements. The ends where resistance measurements were taken were first coated with silver paint to allow for uniform current distribution upon current entry and exit. Table 6 shows the measured dimensions of cut calcined coke samples as well as their corresponding resistivity values. The resistivity p is calculated from equation (S1):

$$\rho = R\frac{wh}{l} \tag{S1}$$

FIG. 7(b) is a visual example of how efficiently the calcined product conducted electricity. When connecting two metal wires to the terminals of a 6V battery, simply touching the ends of these wires to the calcined product produced a glow due to current flow. To quantify the performance as an electrical conductor, a uniform solid disk of biorenewable calcined coke was connected to a variable DC current source and multimeter probes were simultaneously connected to the DC connection clamps. As the current was incrementally increased, the voltage increased in a linear fashion (FIG. 7). After the DC current reached 2.5 amperes, the trend deviated from linear due to increasing temperatures from resistive heating. Since this example did not use a clear geometry for current entry and exit, resistivity values cannot be easily calculated from the I-V curve.

It is important to note that for the starting bottoms material and for the bottoms samples that were only devolatilized, none of the aforementioned electrical behaviors were observed. Hence, the calcination process was critical for influencing the final product properties.

Measurement of metals via x-ray fluorescence (XRF) of the ash provided a direct method for high-resolution measurement, provided that the original concentrations are back-calculated correctly. Sulfur cannot be measured in this method since ashing oxidizes the sulfur into a gaseous product. Table 7 shows XRD direct measurements on the calcined coke itself alongside the results from ash XRF. These values confirm and/or are similar to each other. With the exception of copper, both the direct and ash measurements fall within 500 ppm of each other. Furthermore, sulfur was surprisingly measured to be 306 ppm, which also confirmed the sulfur concentration that is below the 500 ppm threshold for the previous method of sulfur detection.

Experimental for Table 8: followed a one-step calcination procedure, wherein the distillate bottoms were heated in an inert $N_2$ environment at about 480° C. for 20 min, then heated to 1200° C. for 2.5 hr, then gradually cooled back to 600° C. before removal. Table 8 shows elemental and ash testing results for yet a fourth feedstock: horse litter TGRP bio-oil. When calcined for a longer time (2.5 hr), the carbon purity attained was surprisingly the highest from all other previously mentioned results (98.6% C). Similarly, the % oxygen at 0.4% was surprisingly the lowest attained.

Conclusions: We have demonstrated the synthesis and end-use properties of calcined coke obtained from bio-oil distillate bottoms. From the various bio-oils that were distilled, we surprisingly converted the bottoms from various bio-oils into products nearly identical in composition and structure. These calcined cokes were surprisingly superior to calcined petroleum coke by virtue of their low sulfur (trace amounts) and metals content (0.2-1.1 wt %). Characterization by FTIR indicated an initial presence of oxygenated functional groups that disappeared upon calcination, leaving only a dominant aromatic carbon peak with a minor C—O peak. TPO studies confirmed the progressive stabilization and structural ordering that the calcination process introduced into the distillate bottoms. A one-step calcination process was preferred, wherein the devolatilized samples were immediately calcined in situ. Significant crystallite growth occurred for both devolatilization and calcination steps, verified by XRD. SEM images revealed a highly porous structure within sub-mm particles that renders that coke useful for mixtures with carbon anode binders. The electrical conductivity of biorenewable coke enables its application as a valuable substitute for calcined petroleum coke. The lack of any need for desulfurization makes this a valuable process for many industries that use calcined petroleum coke.

Thus in this study, we demonstrated a straightforward conversion of bio-oil distillate bottoms into calcined coke. The higher heating values of distillate bottoms produced "as-is" significantly exceeded that of coal or petroleum coke (HHV=36 MJ/kg, vs. 27 MJ/kg). To evaluate its uses other than fuel, the solid residue was subjected to calcination at 1200° C. for 1 hour under $N_2$ atmosphere. The resulting solid product named "biocoke" was composed of 96-99% carbon, was free from sulfur (<500 ppm), and contained 0.2-1.1% ash. X-ray diffraction of the biocoke confirmed a steady increase in grain size with both devolatilization and with calcination. FTIR spectroscopy indicated a total loss of functional groups with the calcination step, except two broad peaks representing C—C and C—O. Temperature programmed oxidation (TPO) of the bottoms before and after calcination illustrated an increasing structural order via the increasing temperature(s) necessary to oxidize the samples. Images from SEM revealed a bubbly morphology similar to the industrially-favored sponge coke. The electrical resistivity of calcined coke samples measured to be <1.5 mΩ-m, which falls in line with specifications for carbon anodes. Biorenewable calcined coke is an improved alternative to petroleum coke and can find application in carbon anodes, steel carburization, and graphite synthesis.

All of the references cited herein, including U.S. patents, are incorporated by reference in their entirety.

Thus, in view of the above, there is described (in part) the following:

A method of producing calcined coke from bio-oil from a biomass feedstock, said method comprising (or consisting essentially of or consisting of) (1) subjecting said bio-oil to atmospheric distillation in a batch or continuous distillation unit and/or subsequently to vacuum distillation in a batch or continuous vacuum distillation unit to produce coke bottoms, (2) subjecting said coke bottoms to (a) devolatilization at about 400° to about 1000° C. for about 1 to about 30 minutes in an inert gas atmosphere in a reactor to produce devolatilized coke, optionally cooling said devolatlized coke, removing said devolatilized coke from said reactor and optionally crushing said devolatilized coke, and calcining said devolatilized coke at about 1200° C. to about 1400° C. for up to 2 hours in an inert gas atmosphere in a reactor to produce calcined coke; or (b) devolatilization at about 400° to about 1000° C. for about 1 to about 30 minutes in an inert gas atmosphere in a reactor to produce devolatilized coke and calcining said devolatilized coke at about 1200° C. to about 1400° C. for up to 2 hours in an inert gas atmosphere in the same reactor to produce calcined coke; or (c) heating at about 250 to about 400° C. for about 2 to about 10 hours, then subsequent devolatilization at about 400 to about 1000° C. for about 0.5 to about 5 hr to produce devolatilized coke, then calcining said devolatilized coke at about 1200° C. to about 1400° C. for up to about 2 hours in an inert gas atmosphere to produce calcined coke; or (d) stepwise calcination in a continuous calcining reactor between about 200 to about 1400° C. with up to about 1 hr residence time. The above method, comprising (a) devolatilization at about 400° to about 1000° C. for about 1 to about 30 minutes in an inert gas atmosphere in a reactor to produce devolatilized coke, optionally cooling said devolatlized coke, removing said devolatilized coke from said reactor and optionally crushing said devolatilized coke, and calcining said devolatilized coke at about 1200° C. to about 1400° C. for up to 2 hours in an inert gas atmosphere in a reactor to produce calcined coke. The above method, comprising (b) devolatilization at about 400° to about 1000° C. for about 1 to about 30 minutes in an inert gas atmosphere in a reactor to produce devolatilized coke and calcining said devolatilized coke at about 1200° C. to about 1400° C. for up to 2 hours in an inert gas atmosphere in the same reactor to produce calcined coke. The above method, comprising (c) heating at about 250 to about 400° C. for about 2 to about 10 hours, then subsequent devolatilization at about 400 to about 1000° C. for about 0.5 to about 5 hr to produce devolatilized coke, then calcining said devolatilized coke at about 1200° C. to about 1400° C. for up to about 2 hours in an inert gas atmosphere to produce calcined coke. The above method, comprising (d) stepwise calcination in a continuous calcining reactor between about 200 to about 1400° C. with up to about 1 hr residence time.

The above method, where said calcined coke contains about 96 to about 100% carbon (e.g., 96-100%). The above method, where said calcined coke contains at least about 96% carbon (e.g., at least 96%). The above method, where said calcined coke contains at least about 97% carbon (e.g., at least 97%). The above method, where said calcined coke contains at least about 98% carbon (e.g., at least 98%). The above method, where said calcined coke contains about 0 to about 1.5 wt % nitrogen (e.g., 0 to 1.5 wt %). The above method, where said calcined coke contains less than about 1.5 wt % nitrogen (e.g., less than 1.5 wt %). The above method, where said calcined coke contains about 1 wt % nitrogen (e.g., 1 wt %). The above method, where said calcined coke contains about 0.5 wt % nitrogen (e.g., 0.5 wt %). The above method, where said calcined coke contains about 0 to about 3 wt % oxygen (e.g., 0 to 3 wt %). The above method, where said calcined coke contains less than about 2 wt % oxygen (e.g., less than 2 wt %). The above method, where said calcined coke contains less than about 1.5 wt % oxygen (e.g., less than 1.5 wt %). The above method, where said calcined coke contains less than about 1 wt % oxygen (e.g., less than 1 wt %). The above method, where said calcined coke contains 0.5 wt % oxygen (e.g., 0.5 wt %). The above method, where said calcined coke contains about 0 to about 2000 ppm iron (e.g., 0 to 2000 ppm). The above method, where said calcined coke contains less than about 1700 ppp iron (e.g., less than 1700 ppm). The above method, where said calcined coke contains less than about 1500 ppp iron (e.g., less than 1500 ppm). The above method, where said calcined coke contains about 200 to about 500 ppm sulfur (e.g., 200 to 500 ppm). The above method, where said calcined coke contains less than about 500 ppm sulfur (e.g., less than 500 ppm). The above method, where said calcined coke contains less than about 300 ppm sulfur (e.g., less than 300 ppm). The above method, where said calcined coke contains about 0 to about 200 ppm vanadium (e.g., 0 to 200 ppm). The above method, where said calcined coke contains less than about 150 ppm vanadium (e.g., less than 150 ppm). The above method, where said calcined coke contains about 0 to about 300 ppm nickel (e.g., 0 to 300 ppm). The above method, where said calcined coke contains less than about 280 ppm nickel (e.g., less than 280 ppm). The above method, where said calcined coke contains about 0 to about 100 ppm sodium (e.g., 0 to 100 ppm). The above method, where said calcined coke contains less than about 10 ppm sodium (e.g., less than 10 ppm). The above method, where said calcined coke contains about 100 to about 500 ppm calcium (e.g., 100 to 500 ppm). The above method, where said calcined coke contains less than about 400 ppm calcium (e.g., less than 400 ppm). The above method, where said calcined coke contains less than about 250 ppm calcium (e.g., less than 250 ppm). The above method, where said calcined coke contains about 0.02 to about 1.1% ash (e.g., 0.02 to 1.1%). The above method, where said calcined coke contains less than about 1.1% ash (e.g., less than 1.1%). The above method, where said calcined coke contains less than about 1% ash (e.g., less than 1%). The above method, where said calcined coke contains less than about 0.5% ash (e.g., less than 0.5%). The above method, where said calcined coke contains less than about 0.4% ash (e.g., less than 0.4%). The above method, where said calcined coke contains less than about 0.2% ash (e.g., less than 0.2%). The above method, where said calcined coke has less than about 2 $\Omega$-mm electrical resistivity (e.g., less than 2 $\Omega$-mm). The above method, where said calcined coke has about 1 to about 2 $\Omega$-mm electrical resistivity (e.g., 1 to 2 $\Omega$-mm). The above method, where said calcined coke has HHV of about 30 to 40 MJ/kg). The above method, wherein said calcined coke has HHV of about 36 MJ/kg (e.g., 36 MJ/kg). The above method, where said calcined coke has HHV of about 33.3 MJ/kg (e.g., 33.3 MJ/kg). The above method, where said calcined coke contains about 0 to about 4 wt % hydrogen (e.g., 0 to 4 wt %). The above method, where said calcined coke contains less than about 4 wt % hydrogen (e.g., less than 4 wt %). The above method, where said calcined coke contains less than about 1 wt % hydrogen (e.g., less than 1 wt %). The above method, where said biomass feedstock is selected from the group consisting of lignocellulosic biomass, animal waste products, and mixtures thereof.

The above amounts and ranges are not meant to be limiting, and increments between the recited percentages and ranges are specifically envisioned as part of the invention.

The above method, where said bio-oil is produced by a method comprising (or consisting essentially of or consisting of) (1) pyrolyzing said feedstock in an inert atmosphere in a reactor to produce bio-oil, bio-char and non-condensable gases; (2) recycling about 10 to about 99% of said non-condensable gases to said reactor to produce deoxygenated bio-oil; wherein said method is conducted in the absence of oxygen and wherein said method does not utilize externally added catalysts.

Calcined coked produced by the above method.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Chemical and physical properties of petroleum-derived coke products and pyrolysis-derived biochar.

|   | Petroleum coke | | Biochar |
|---|---|---|---|
|   | (Raw) | (Calcined) | (SwG) |
| C | 90 | >96 | 63.1 |
| H | <4 | <0.1 | 3.7 |
| N | 2-3 | 1-1.5 | 0.78 |
| O | 1-1.5 | 0 | 5.6 |
| S | 3 | 3 | — |
| HHV (MJ/kg) | 31.3 | — | 20.1 |
| % ash | <0.4 | <0.4 | 26.9 |
| % volatiles | 10-12 | <0.4 | |

TABLE 2

Characterization of distillate bottoms products at various stages of the calcination process.

|   | Bottoms | | | | Devolatilized | | | Calcined | | | |
|---|---|---|---|---|---|---|---|---|---|---|---|
|   | SwG | Eucal | Guay | SwG-reg | SwG | Eucal | Guay | SwG | Eucal | Guay | SwG-reg |
| C | 86.82 | 84.32 | 80.09 | 71.09 | 93.77 | 95.07 | 93.08 | 96.06 | 97.78 | 97.26 | 93.06 |
| H | 4.9 | 5.4 | 7.19 | 4.3 | 0.72 | 0.32 | 0.82 | 0.89 | 0.53 | 0.31 | 0.18 |
| N | 1.31 | 0.41 | 2.9 | 1.05 | 1.32 | 0.77 | 2.83 | 0.57 | 0.34 | 1.04 | 0.52 |
| O | 6.97 | 9.87 | 9.82 | 23.56 | 4.19 | 3.84 | 3.27 | 2.48 | 1.35 | 1.39 | 6.24 |
| S | | | | | <0.05 | <0.05 | <0.05 | | | | |
| HHV (MJ/kg) | 36.4 | 34.4 | 32.6 | 29.0 | 32.9 | 34.5 | 34.0 | 33.3 | 33.4 | 33.4 | 33.3 |
| % ash | | | | | | | | 0.7 | 0.2 | 1.1 | 0.3 |

(SwG = switchgrass, Eucal = eucalyptus, Guay = guayule, all using TGRP process. SwG-reg = switchgrass using traditional pyrolysis)

TABLE 3

Metals content of calcined distillate bottoms samples, as determined by XRF of ash. Values are compared with general specifications for petroleum coke.

| metal (ppm) | SwG | Eucal | Guay | petcoke* |
|---|---|---|---|---|
| Na | — | — | — | <100 |
| Si | 884 | tr | 510 | <250 |
| K | 296 | 321 | 1298 | |
| Ca | 250 | 113 | 414 | <200 |
| V | — | — | 148 | <300 |
| Cr | — | — | 133 | |
| Fe | 1424 | 395 | 1678 | <300 |
| Ni | 220 | — | 277 | <200 |
| Cu | 432 | 227 | 1460 | |
| Zn | 917 | — | 569 | |

*Note that different companies give different specifications for their prior art.

TABLE 4

Crystal size parameters of distillate bottoms, calculated based on XRD results.

|   | Bottoms | | | | Devolatilized | | | | Calcined | | | |
|---|---|---|---|---|---|---|---|---|---|---|---|---|
| length (A) | SwG | SwG-R | Eucal | Guay | SwG | SwG-R | Eucal | Guay | SwG | SwG-R | Eucal | Guay |
| d | 3.81 | 4.03 | 3.98 | 3.73 | 3.68 | 3.83 | 3.66 | 3.69 | 3.57 | 3.76 | 3.80 | 3.61 |
| $L_c$ | 18.2 | 22.5 | 18.4 | 27.6 | 21.9 | 20.9 | 26.5 | 22.5 | 33.7 | 22.4 | 24.8 | 25.6 |
| $L_a$ | 18.7 | 17.6 | 26.9 | 27.5 | 29.3 | 26.7 | 28.4 | 39.8 | 69.6 | 41.8 | 46.2 | 29.7 |

TABLE 5

Measured values of shaped calcined coke samples; the resistivity values (ρ) are calculated based upon the measured dimensions and electrical resistances.

| L (mm) | w | h | R (Ω) | ρ (Ω-mm) |
|---|---|---|---|---|
| 21.7 | 7.1 | 3.9 | 1.2 | 1.53 |
| 20 | 7 | 4 | 1.1 | 1.54 |
| 15.2 | 3.8 | 2.6 | 2 | 1.30 |
| 10.4 | 5.5 | 3.6 | 1.1 | 2.09 |
| | | | Average | 1.62 |
| | | | St dev | 0.34 |

TABLE 6

Comparison of XRF elemental concentrations in SwG calcined coke, as measured directly on the sample vs. measured from the sample ash.

| | SwG-calcined, f/sample | SwG-calcined, f/ash |
|---|---|---|
| Na | 194 | |
| Mg | | |
| Si | 507 | 884 |
| P | | |
| S | 306 | |
| K | 258 | 296 |
| Ca | | 250 |
| V | | |
| Fe | 941 | 1424 |
| Ni | 259 | 220 |
| Cu | 1012 | 432 |

TABLE 7

Proximate and total analysis of bottoms obtained from distilling horse litter TGRP oil. This calcination was performed at 1200° C. for 2.5 hr.

| | Horse litter bottoms | Horse litter bottoms, calcined |
|---|---|---|
| C | 79.07 | 98.64 |
| H | 5.66 | 0.23 |
| N | 1.27 | 0.72 |
| O | 14.00 | 0.41 |
| S | | <0.05 |
| % ash | | 0.49 |

We claim:

1. A method of producing calcined coke from bio-oil from a biomass feedstock, said method comprising
   (1) subjecting said bio-oil to atmospheric distillation in a batch or continuous distillation unit and/or subsequently to vacuum distillation in a batch or continuous vacuum distillation unit to produce coke bottoms,
   (2) subjecting said coke bottoms to
   (a) devolatilization at about 400° to about 1000° C. in an inert gas atmosphere in a reactor to produce devolatilized coke, optionally cooling said devolatlized coke, removing said devolatilized coke from said reactor and optionally crushing said devolatilized coke, and calcining said devolatilized coke at about 1200° C. to about 1400° C. in an inert gas atmosphere in a reactor to produce calcined coke; or
   (b) devolatilization at about 400° to about 1000° C. in an inert gas atmosphere in a reactor to produce devolatilized coke and calcining said devolatilized coke at about 1200° C. to about 1400° C. in an inert gas atmosphere in the same reactor to produce calcined coke; or
   (c) heating at about 250° to about 400° C., then subsequent devolatilization at about 400° to about 1000° C. to produce devolatilized coke, then calcining said devolatilized coke at about 1200° C. to about 1400° C. in an inert gas atmosphere to produce calcined coke; or
   (d) calcination in a continuous calcining reactor between about 200° about 1400° C. to produce calcined coke;
   where said calcined coke has less than about 2 Ω-mm electrical resistivity.

2. The method according to claim 1, where said calcined coke contains about 96 to about 100% carbon.

3. The method according to claim 1, where said calcined coke contains at least about 96% carbon.

4. The method according to claim 1, where said calcined coke contains at least about 97% carbon.

5. The method according to claim 1, where said calcined coke contains at least about 98% carbon.

6. The method according to claim 1, where said calcined coke contains about 0 to about 1.5 wt % nitrogen.

7. The method according to claim 1, where said calcined coke contains less than about 1.5 wt % nitrogen.

8. The method according to claim 1, where said calcined coke contains about 1 wt % nitrogen.

9. The method according to claim 1, where said calcined coke contains about 0.5 wt % nitrogen.

10. The method according to claim 1, where said calcined coke contains about 0 to about 3 wt % oxygen.

11. The method according to claim 1, where said calcined coke contains less than about 2 wt % oxygen.

12. The method according to claim 1, where said calcined coke contains less than about 1.5 wt % oxygen.

13. The method according to claim 1, where said calcined coke contains less than about 1 wt % oxygen.

14. The method according to claim 1, where said calcined coke contains less than about 0.5 wt % oxygen.

15. The method according to claim 1, where said calcined coke contains about 0 to about 2000 ppm iron.

16. The method according to claim 1, where said calcined coke contains less than about 1700 ppp iron.

17. The method according to claim 1, where said calcined coke contains less than about 1500 ppp iron.

18. The method according to claim 1, where said calcined coke contains less than about 500 ppm sulfur.

19. The method according to claim 1, where said calcined coke contains less than about 300 ppm sulfur.

20. The method according to claim 1, where said calcined coke contains about 0 to about 200 ppm vanadium.

21. The method according to claim 1, where said calcined coke contains less than about 150 ppm vanadium.

22. The method according to claim 1, where said calcined coke contains about 0 to about 300 ppm nickel.

23. The method according to claim 1, where said calcined coke contains less than about 280 ppm nickel.

24. The method according to claim 1, where said calcined coke contains about 0 to about 100 ppm sodium.

25. The method according to claim 1, where said calcined coke contains less than about 10 ppm sodium.

26. The method according to claim 1, where said calcined coke contains about 100 to about 500 ppm calcium.

27. The method according to claim 1, where said calcined coke contains less than about 400 ppm calcium.

28. The method according to claim 1, where said calcined coke contains less than about 250 ppm calcium.

29. The method according to claim 1, where said calcined coke contains about 0.02 to about 1.1% ash.

30. The method according to claim 1, where said calcined coke contains less than about 1.1% ash.

31. The method according to claim 1, where said calcined coke contains less than about 1% ash.

32. The method according to claim 1, where said calcined coke contains less than about 0.5% ash.

33. The method according to claim 1, where said calcined coke contains less than about 0.4% ash.

34. The method according to claim 1, where said calcined coke contains less than about 0.2% ash.

35. The method according to claim 1, where said calcined coke has HHV of about 36 MJ/kg.

36. The method according to claim 1, where said calcined coke has HHV of about 33.3 MJ/kg.

37. The method according to claim 1, where said calcined coke contains about 0 to about 4 wt % hydrogen.

38. The method according to claim 1, where said calcined coke contains less than about 4 wt % hydrogen.

39. The method according to claim 1, where said calcined coke contains less than about 1 wt % hydrogen.

40. The method according to claim 1, where said biomass feedstock is selected from the group consisting of lignocellulosic biomass, animal waste products, and mixtures thereof.

41. The method according to claim 1, where said bio-oil is produced by a method comprising (1) pyrolyzing said feedstock in an inert atmosphere in a reactor to produce bio-oil, bio-char and non-condensable gases; (2) recycling about 10 to about 99% of said non-condensable gases to said reactor to produce deoxygenated bio-oil; wherein said method is conducted in the absence of oxygen and wherein said method does not utilize externally added catalysts.

42. The method according to claim 1, wherein said method comprises
  (1) subjecting said bio-oil to atmospheric distillation in a batch or continuous distillation unit and/or subsequently to vacuum distillation in a batch or continuous vacuum distillation unit to produce coke bottoms, wherein the oxygen in said bio-oil has not been removed from said bio-oil prior to said atmospheric distillation and said vacuum distillation,
  (2) subjecting said coke bottoms to
  (a) devolatilization at about 400° to about 1000° C. in an inert gas atmosphere in a reactor to produce devolatilized coke, optionally cooling said devolatlized coke, removing said devolatilized coke from said reactor and optionally crushing said devolatilized coke, and calcining said devolatilized coke at about 1200° C. to about 1400° C. in an inert gas atmosphere in a reactor to produce calcined coke; or
  (b) devolatilization at about 400° to about 1000° C. in an inert gas atmosphere in a reactor to produce devolatilized coke and calcining said devolatilized coke at about 1200° C. to about 1400° C. in an inert gas atmosphere in the same reactor to produce calcined coke; or
  (c) heating at about 250° to about 400° C., then subsequent devolatilization at about 400° to about 1000° C. to produce devolatilized coke, then calcining said devolatilized coke at about 1200° C. to about 1400° C. in an inert gas atmosphere to produce calcined coke; or
  (d) calcination in a continuous calcining reactor between about 200° C. about 1400° C. to produce calcined coke.

* * * * *